United States Patent [19]

Volk, Jr.

[11] Patent Number: 4,528,489
[45] Date of Patent: Jul. 9, 1985

[54] ELECTRICAL REMOTE CONTROL CIRCUIT

[75] Inventor: Joseph A. Volk, Jr., Florissant, Mo.

[73] Assignee: Beta Corporation of St. Louis, St. Louis, Mo.

[21] Appl. No.: 479,156

[22] Filed: Mar. 28, 1983

[51] Int. Cl.³ .............................................. H02P 3/10
[52] U.S. Cl. .................................... 318/480; 318/287; 318/293
[58] Field of Search ............... 318/640, 480, 287, 288, 318/289, 319, 293, 291, 290

[56] References Cited

U.S. PATENT DOCUMENTS

| | | | |
|---|---|---|---|
| 3,444,448 | 5/1969 | Welch | 318/289 |
| 3,818,310 | 6/1974 | Smith | 318/293 |
| 3,896,355 | 7/1975 | Guicheteau | 318/288 X |
| 3,921,048 | 11/1975 | Padgitt | 318/480 |
| 4,152,634 | 5/1979 | Penrod | 318/289 X |
| 4,282,464 | 8/1981 | Uzuka | 318/288 X |

FOREIGN PATENT DOCUMENTS 1402771 8/1975 United Kingdom ................ 318/288

Primary Examiner—B. Dobeck
Attorney, Agent, or Firm—Rogers, Howell, Renner, Moore & Haferkamp

[57] ABSTRACT

A remote control circuit for a hard wired remote control controlling multiple functions in a multiple motor device has a reduced number of wires extending between the hand held control and the motor control circuit. The circuit includes a rectifier for generating a positive control voltage and a negative control voltage which are separately supplied along individual wires to the hand held control, and a single wire extending between the hand held control and the control circuit for each function, the voltage appearing along the wire designating the direction of movement of the function. A pair of parallel connected LEDs sense the polarity of the voltage and energize a triac corresponding to the polarity of the voltage appearing along the control wire to energize the proper winding of a reversible motor.

18 Claims, 1 Drawing Figure

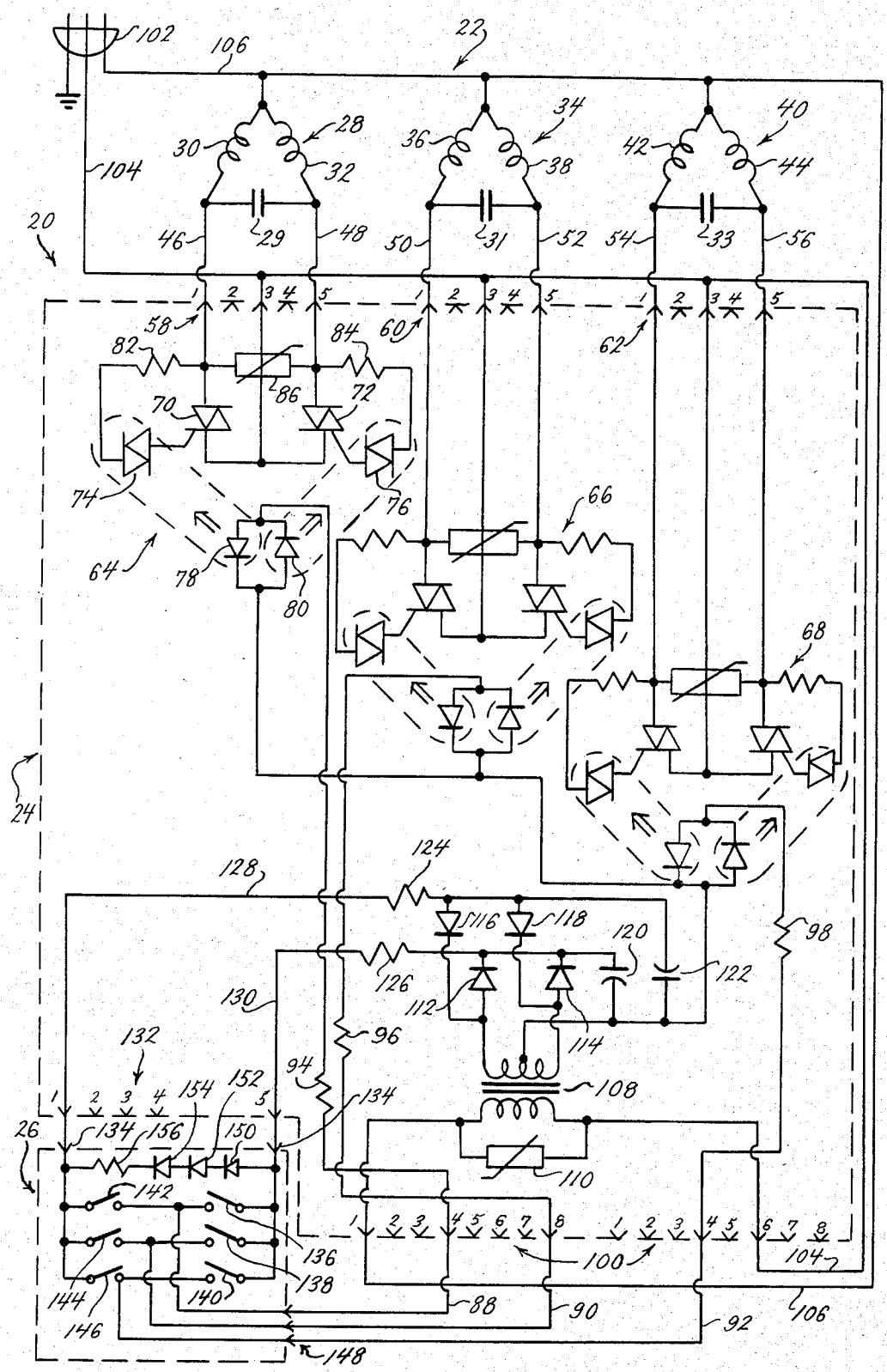

4,528,489

ELECTRICAL REMOTE CONTROL CIRCUIT

BACKGROUND AND SUMMARY

There are many devices which have remote controls mounted at the end of a cable or the like, with the remote controls having switches to control the operation thereof. An example of this is the remote controlled hospital bed which typically has a hand control mounted at the end of a cable, with the cable extending to a control box beneath the bed. One or more motors, and their associated gearing as is known in the art, are used to control the position of the various parts of the bed. For example, one reversing motor may control the angle of the back of the bed with respect to the rest of the bed, another motor may be used to control the overall height of the bed from the floor, and still a third motor may be used to control the amount of angle formed between the bottom of the bed and the midportion of the bed at the knee.

For each motor provided, and each movement of a portion of the bed, there are generally two switches mounted in the hand control. One switch may be depressed to raise that portion of the bed being controlled, and the other switch used to lower that portion. Generally, the control circuit provides one wire extending between the control box and hand control which is electrically "hot", and one return wire for each switch contained in the hand control. Thus, for a two motor bed providing up and down movement for the back and the entire bed, four switches are mounted in the hand control and five wires extend between the hand control and the control box. Similarly, for a three motor bed providing up and down movement for three different portions of the bed, six switches are provided in the hand control and seven wires in the cable extending between the hand control and the control box.

The inventor herein has succeeded in designing a control circuit which eliminates one or more wires which must be included in the cable extending between the control box and the hand held remote control. This provides many advantages, including cost, ease of installation, increased flexibility of the control cable as a smaller number of wires need be contained therein for any number of functions, and additional features as will be described. Essentially, the new control circuit provides for the generation of a positive control voltage which is conducted along one wire, and a negative control voltage which is conducted along another wire from the control box to the hand held control. The negative voltage feeds all of the "down" switches, for example, for each direction of movement while the positive voltage feeds all of the "up" switches for all of the directions of movement. Additionally, one wire connects the outputs of each pair of switches for each function and returns to the control box. Thus, for a three function bed, the control cable includes only two wires carrying the positive and negative control voltage and three wires carrying the control signal from each of the three pairs of switches. For a three function bed only five wires need be included in the cable as opposed to the seven wires required in the prior art. In operation, as either switch is depressed for any function, the control voltage flows along the corresponding wire to the pair of LEDs connected in parallel and reverse polarity, each LED being opti-coupled with a photo emitting diode to trigger a photo sensitive triac to complete the circuit across the selected winding of the selected motor. Consequently, this solid state control circuit provides the significant advantage of reducing the number of wires which must be included in a control cable, and which provides other features and advantages more fully explained by referring to the drawings and the description of the preferred embodiment which follows:

BRIEF DESCRIPTION OF THE DRAWING

The FIGURE depicts an electrical connection diagram showing the three motors for a three function bed, the control box containing a control circuit for each motor, and the connections required to a hand held control.

DESCRIPTION OF PREFERRED EMBODIMENT

The remote control curcuit 20 of the present invention is shown in the drawing and generally includes a motor portion 22, a control box portion 24, and a hand held control protion 26. The motor portion 22 includes a back motor 28 which is a reversible motor having windings 30 for "up" and 32 for "down". Similarly, a high motor 34 has an "up" winding 36 and a "down" winding 38. Finally, knee motor 40 has an "up" winding 42 and a "down" winding 44. Each motor also has a capacitor 29,31,33, as is known in the art. Each of the motors 28, 34, 40 have a pair of wires 46, 48, 50, 52, 54, 56, respectively, which extend to a connector 58, 60, 62, respectively, in the control box portion 24. The control box portion 24 has a motor control circuit 64, 66, 68 which controls the energization of motors 28, 34, 40, respectively. As each motor control circuit 64, 66, 68 is identical, only one shall be described with greater detail. Motor control circuit 64 includes a pair of triacs 70, 72, each of which is triggered by a photo sensitive triac 74, 76 which are light coupled to a pair of parallel connected LEDs 78, 80. A pair of 100 ohm resistors 82, 84 complete the triggering circuit for triacs 70, 72. A transient suppressor 86 is connected across motor capacitor 29 to prevent damage to any part of the circuit. A single wire 88, 90, 92 carries the control voltage to the parallel connected LEDs 78, 80 through 100 ohm resistors 94, 96, 98, as shown. These wires connect to a connector 100 and extends to the remote control portion 26, as shown. AC power is supplied to the entire circuit 20 through an outlet plug 102 with wires 104, 106 extending through the motor portion 22 and to the control box portion 24 into connector 100, as shown. This AC power is then supplied to a voltage transformer 108 with a transient suppressor 110 connected acrossed its input and four diodes 112, 114, 116, 118 rectifying its output to provide a positive voltage across capacitor 120 and a negative voltage across capacitor 122. This positive and negative control voltage is supplied through 100 ohm resistors 124, 126, and wires 128, 130 through connector 132 to the remote control portion 26, as shown. The remote control portion 26 thus has a positive control voltage carried along wire 130 through connector 132 and connector 134 to one side of each of three "up" switches 136, 138, 140. Similarly, a negative control voltage is supplied along wire 128 through connector 132 and connector 134 to one side of each of three switches 142, 144, 146. As shown, these switches are paired by function such that the "back" function includes switches 136, 142 with their outputs joined together by wire 88 extending through connector 148 and back to connector 100 in control box portion 24. Similarly, the output of the "bed" function switches 138, 144 are connected by wire 90 extending through connector 148. Lastly, the "knee" function includes up-down switches 140, 146 with their outputs connected by wire 92 extending through connector 148. Three LEDs 150, 152, 154 and 1K ohm resistor 156 are connected across wires 128, 130 to provide back lighting for remote control portion 26. LEDs 150, 152, 154 also illuminate to indicate that the bed control is plugged in, and dim due to voltage drop when the motors are running to indicate that condition.

OPERATION

The operation of the remote control circuit of the present invention is elegantly simple and yet provides for a reduced number of wires extending between the control box and hand held remote control. As described above, a pair of wires deliver a positive control voltage and a negative control voltage to the hand held control, with the positive voltage feeding the "up" set of switches and the negative voltage feeding the "down" set of switches. Each pair of switches for each function have their outputs connected together and a single wire extending back through the same control cable to the control box. Thus, for a three function control, only five wires are required, i.e. two for the control voltage and one each for each function. In operation, as, for instance, the back "up" switch is closed, a positive voltage is conducted along wire 88, through resistor 94, to the parallel connected diodes 78, 80. Because of the polarity, only diode 78 is energized which in turn energizes photo electric triac 74, and triac 70 which completes the circuit between wire 104 of the AC plug 102, across winding 30, to the neutral 106 of connector 102. Thus, the "up" winding is energized which moves the back of the bed up until the switch is released.

Although single pole double throw switches can be provided for each function which mechanically prevents the simultaneous energization of the up and down sides of a single function, the circuit of the present invention provides a safety which prevents a high current condition. For example, should switches 136, 142 be closed at the same time the output of voltage transformer 108 is protected by resistors 124, 126 which limit the current to levels safely handled by switches 136, 142 and the other components of the control box portion 24. Of course, the presence of both positive and negative voltages result in a net 0 output voltage which cannot energize either LED.

It would be apparent to one of ordinary skill in the art that less than three functions could be provided with the present invention by simply eliminating the motor and motor control, along with one wire extending to the hand held control and a pair of function switches included therein. Thus, two motors could be controlled in each of two directions with four switches in the hand held control and four wires extending from the control box to the hand held control.

Various changes and modifications would be apparent to one of ordinary skill in the art. These changes and modifications are included within the teaching of this invention which is limited only by the scope of the claims appended hereto.

What is claimed is:

1. A remote control circuit for a hard wired remote control to operate a multi-function device, each function of said device having a two winding motor associated therewith, said remote control circuit having a first wire for carrying a positive control signal to said remote control, a second wire for carrying a negative control signal to said remote control, said remote control having a switch means for each function, a return wire associated with each said switch means so that operation of one of said switch means places either said positive or said negative control signal on said switch means' associated return wire, and said device having a polarity sensitive motor control means connected to said return wires to sense the polarity of the control signal and operate the selected winding of the selected motor.

2. The device of claim 1 wherein said polarity sensitive motor control means comprises a pair of parallel connected LEDs, each of said LEDs being photo-electrically coupled to a photo sensitive triac, each photo sensitive triac being in circuit with the gate of a second triac to trigger said second triac, said second triac being in circuit with a motor winding corresponding to the function being controlled.

3. The device of claim 1 wherein each switch means comprises a pair of normally open, single pole switches.

4. The device of claim 1 further comprising a transformer and rectifier means to generate said positive and negative control signals, and means to limit the current through said transformer and rectifier means.

5. The device of claim 1 wherein each motor has a capacitor connected between its windings, and further comprising a transient suppression means connected across said capacitor.

6. The device of claim 1 wherein the multifunction device comprises an adjustable bed, said two winding motors comprising reversing motors for raising and lowering different parts of said bed, and said hard wired remote control comprising a hand control mounted at the end of said first, second, and return wires, each of said switch means comprising a pair of single pole single throw switches mounted in said hand control.

7. The device of claim 6 further comprising means to backlight said hand control comprising at least one LED connected between said first and second wires.

8. The device of claim 6 further comprising means to indicate when the remote control circuit and hand control are on.

9. The device of claim 8, further comprising means to indicate when one of said motors is energized.

10. A remote control circuit for a hard wired remote control to operate an adjustable bed, said bed having a plurality of reversing motors, each of said motors being mechanically connected to a portion of said bed to raise and lower same, said remote control circuit comprising a control cable extending between said control circuit and said remote control, means for generating a positive control signal, said control cable having a first wire for carrying said positive control signal, means for generating a negative control signal, said control cable having a second wire for carrying said negative control signal, said remote control including a pair of single pole, normally open switches to control each reversing motor, said control cable including a return wire for each said pair of switches and connected to a terminal of each, the first wire connected to the other terminal of one of each of said pair and the second wire connected to the other terminal of the other of each of said pair, so that operation of one switch of a pair places a positive control signal on its associated return wire and the operation of the other switch of the pair places a negative control signal on its associated return wire, said control circuit further comprising a pair of LEDs connected in parallel and reverse polarity to each of the return wires, each of said LEDs being photoelectrically coupled to a photo sensitive triac, each of said photo sensitive triacs being in circuit with the gate of another triac, said other triac being in circuit with one winding of one of said reversing motors so that the positive control signal along a return wire will operate one LED and its associated pair of triacs and motor winding and the negative control signal along the same return wire will operate the other LED of said pair and its associated pair of triacs and motor winding, said motor windings being the reversing windings of the same motor.

11. The device of claim 10 wherein two motors are included in the bed.

12. The device of claim 10 wherein three motors are included in the bed.

13. The device of claim 10 further comprising means to backlight the remote control comprising at least one LED connected between said first and second wires.

14. The device of claim 10 wherein the positive and negative control signal generating means comprises a center tapped transformer and a plurality of diodes connected to the output of said transformer.

15. The device of claim 14 further comprising current limit means connected to the output of said positive and negative control signal generating means.

16. The device of claim 15 wherein the current limit means comprises a resistor connected in each of said first and second wires.

17. The device of claim 14 further comprising a transient suppression means connected across the primary of said transformer.

18. The device of claim 10 wherein each motor has a capacitor, and further comprising a transient suppression means connected across each of said capacitors.

* * * * *